US008953928B2

(12) United States Patent
Beacham et al.

(10) Patent No.: US 8,953,928 B2
(45) Date of Patent: Feb. 10, 2015

(54) BOOKMARKS IN RECORDED VIDEO

(75) Inventors: Gordon B. Beacham, San Diego, CA (US); Louis D. Bifano, Morrisville, PA (US); Gerald R. Johnson, Cataumet, MA (US); Jason E. Krasnow, Cincinnati, OH (US)

(73) Assignee: Google Technology Holdings LLC, Mountain View, CA (US)

( * ) Notice: Subject to any disclaimer, the term of this patent is extended or adjusted under 35 U.S.C. 154(b) by 17 days.

(21) Appl. No.: 12/975,003

(22) Filed: Dec. 21, 2010

(65) Prior Publication Data
US 2012/0155834 A1 Jun. 21, 2012

(51) Int. Cl.
| H04N 9/80 | (2006.01) |
| H04N 5/93 | (2006.01) |
| H04N 9/87 | (2006.01) |
| H04N 5/85 | (2006.01) |
| H04N 21/458 | (2011.01) |
| G11B 27/10 | (2006.01) |
| G11B 27/034 | (2006.01) |
| H04N 21/472 | (2011.01) |
| H04N 21/433 | (2011.01) |
| H04N 21/845 | (2011.01) |
| H04N 21/8549 | (2011.01) |

(52) U.S. Cl.
CPC ............ *H04N 21/458* (2013.01); *G11B 27/105* (2013.01); *G11B 27/034* (2013.01); *H04N 21/47217* (2013.01); *H04N 21/4334* (2013.01); *H04N 21/472* (2013.01); *H04N 21/8455* (2013.01); *H04N 21/8456* (2013.01); *H04N 21/8549* (2013.01)
USPC .......................................... 386/239; 386/240

(58) Field of Classification Search
CPC ............... G11B 27/105; G11B 27/034; H04N 21/47217; H04N 21/4334; H04N 21/458; H04N 21/8549; H04N 21/8455; H04N 21/8456; H04N 21/472
USPC .................................................. 386/239–242
See application file for complete search history.

(56) References Cited

U.S. PATENT DOCUMENTS

| 7,242,809 | B2 | 7/2007 | Hunter et al. | |
| 2003/0016951 | A1* | 1/2003 | Jakel et al. | 386/125 |
| 2004/0223737 | A1 | 11/2004 | Johnson | |
| 2005/0031303 | A1* | 2/2005 | Park | 386/69 |
| 2005/0210145 | A1* | 9/2005 | Kim et al. | 709/231 |
| 2006/0204220 | A1* | 9/2006 | Lee | 386/95 |
| 2007/0036522 | A1* | 2/2007 | Yoshida et al. | 386/96 |
| 2007/0244903 | A1* | 10/2007 | Ratliff et al. | 707/10 |
| 2008/0092168 | A1* | 4/2008 | Logan et al. | 725/44 |
| 2008/0126919 | A1* | 5/2008 | Uskali et al. | 715/200 |
| 2009/0180763 | A1* | 7/2009 | McCarthy et al. | 386/124 |

* cited by examiner

Primary Examiner — Gelek W Topgyal
(74) Attorney, Agent, or Firm — Byrne Poh LLP

(57) ABSTRACT

In general, in one aspect, the disclosure describes a video recording system including a user interface to enable a user to enter commands. A bookmark manager is to generate bookmarks corresponding to locations in the videos being recorded based on bookmark commands received, to assign end points for the bookmarks, and to generate a program based on selection of one or more of the recorded videos and selection of at least a subset of the bookmarks associated with the one or more recorded videos. A video record/playback manager is to control recording of the videos and the associated bookmarks and to present the program by playing the at least a subset of the associated bookmarks for the one or more of the recorded videos. Playback of each of the at least a subset of the associated bookmarks is to end at the assigned endpoint.

12 Claims, 3 Drawing Sheets

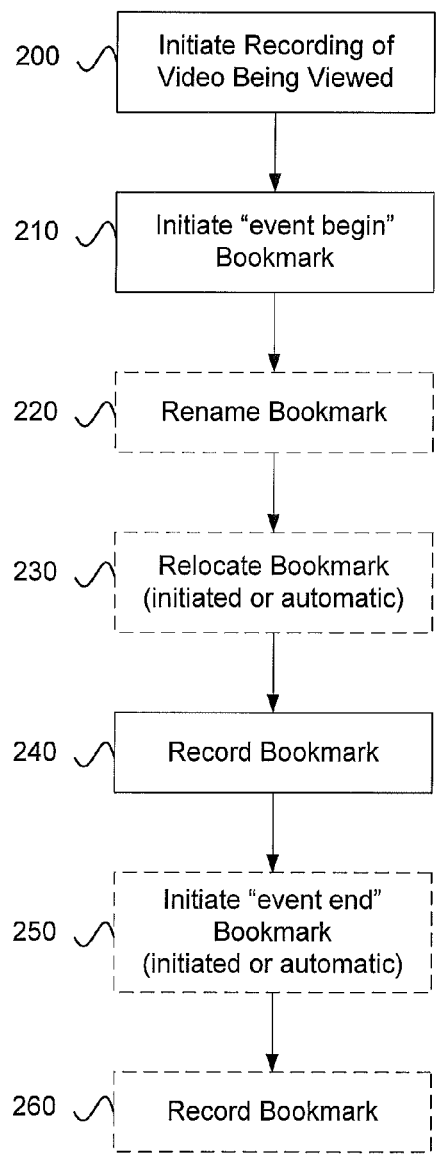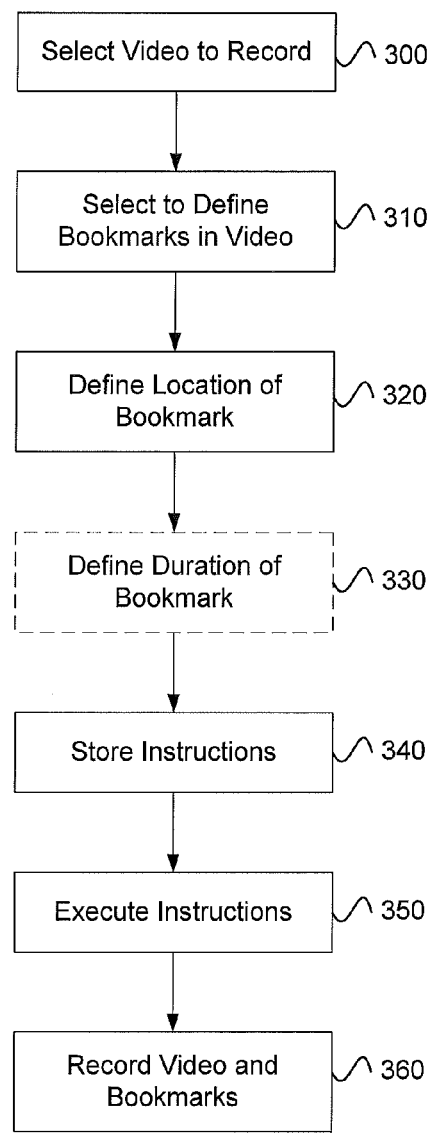
FIG. 2
FIG. 3

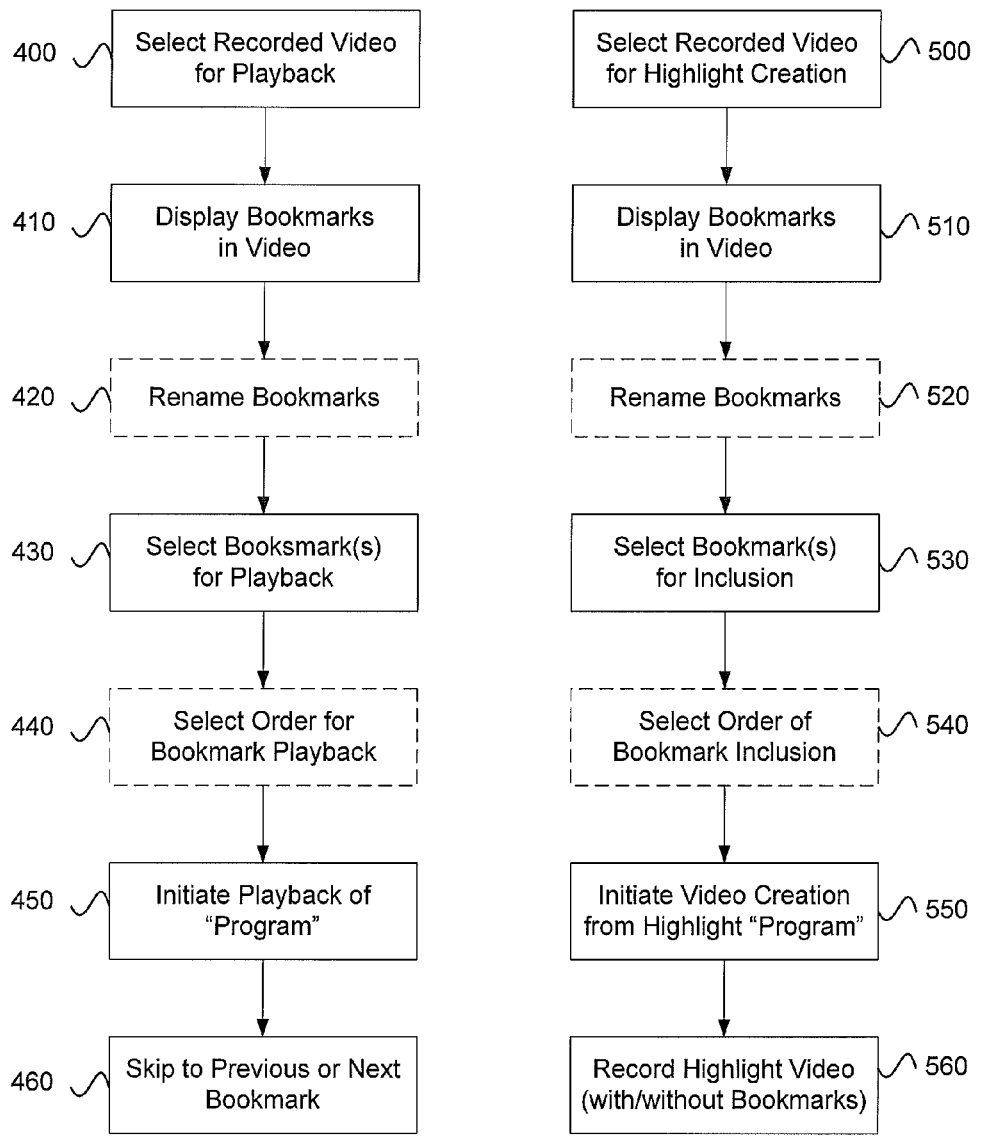

BOOKMARKS IN RECORDED VIDEO

BACKGROUND

Video Recording Systems (VRSs), such as Personal Video Recorders (PVRs) and Digital Video Recorders (DVRs), allow a user to record programming events to a hard drive (e.g., as a recorded event) or to a storage buffer for later viewing. VRSs can store the last played position so that a user can resume the playback of a video program from the last played position. However, VRSs do not allow a user to tag or bookmark a particular video segment in a program for later reference purposes. Therefore, should the user wish to return to the particular video segment at a later time, this cannot be done without rewinding or fast-forwarding to search for the desired segment. For example, if the user wishes to show a particular news clip from a recorded news program to another person, the user must first take the time and effort to fast-forward or rewind to that point. The user can only return to the last played position and cannot jump to anywhere else in the recorded event.

Accordingly, it would be desirable and highly advantageous to have a method and apparatus for allowing a user of a VRS to create and manage video bookmarks. Such video bookmarks would allow a user to "jump" to a desired video segment during playback. Furthermore it would be desirable and highly advantageous to have a method and apparatus for defining durations for the bookmarks so that automatic playback from a set of bookmarks can be implemented.

SUMMARY

According to an embodiment, a video recording system is disclosed including a video input interface to receive video streams from a video source; a user interface to select a first video to be recorded, to identify a first set of points of interest in the first video, to configure a program that includes selection of a second video and a second set of points of interest for the second video, and to initiate viewing of the program; a bookmark manager to generate a first set bookmarks and manage placement of the first set of bookmarks at locations in the first video based on the first set of points of interest identified, to associate durations with the first set of bookmarks, to identify a second set of bookmarks associated with the second video to be included in the program, and to identify durations associated the second set of bookmarks; a storage medium to store the first video, the first set of bookmarks, the second video, and the second set of bookmarks; a video record/playback manager to control recording of the first video and the first set of bookmarks to the storage medium, to control playback of the second video in order to present the program, wherein for each of the second set of bookmarks playback begins at an associated location in the second video and continues for the duration associated therewith; and a video output interface to provide the first video and the program to a display device.

According to another embodiment, a video recording system is disclosed including a video input interface to receive videos provided by a video source; a user interface to enable a user to enter commands; a bookmark manager to generate bookmarks corresponding to locations in the videos being recorded based on bookmark commands received, to assign end points for the bookmarks, and to generate a program based on selection of one or more of the recorded videos and selection of at least a subset of the bookmarks associated with the one or more recorded videos; a storage medium to store the recorded videos and the associated bookmarks; a video record/playback manager to control recording of the videos and the associated bookmarks to the storage medium, and to control playback of the at least a subset of the associated bookmarks for the one or more of the recorded videos in order to present the program, wherein playback of each of the at least a subset of the associated bookmarks is to end at the assigned endpoint; and a video output interface to transmit a video selected for display to a display.

According to a further embodiment, a processor implemented method is utilized in a video recording system to generate and manage bookmarks, the method utilizing the processor to: generate bookmarks corresponding to locations in videos being recorded based on bookmark commands received; assign end points for the bookmarks based on the bookmark commands received; display a list of recorded videos and the bookmarks associated therewith for selection; generate a program based on the selection of one or more of the recorded videos and selection of at least a subset of the bookmarks associated with the one or more recorded videos; and play the program from the recorded videos by playing the at least a subset of the associated bookmarks selected for the one or more of the recorded videos selected. Playback of each of the at least a subset of the associated bookmarks is to end at the assigned endpoint.

BRIEF DESCRIPTION OF THE DRAWINGS

The features and advantages of the various embodiments will become apparent from the following detailed description in which:

FIG. 2 illustrates an example flow chart for user initiation of bookmark(s) during viewing of video being recorded, according to one embodiment.

FIG. 3 illustrates an example flow chart for preprogramming of bookmark(s) to be inserted in video to be recorded, according to one embodiment.

FIG. 4 illustrates an example flow chart for playback of recorded video(s) with bookmark(s), according to one embodiment.

FIG. 5 illustrates an example flow chart for creation of a new video (e.g., highlight video) from recorded video(s) with bookmark(s), according to one embodiment.

DETAILED DESCRIPTION

Figure 1:
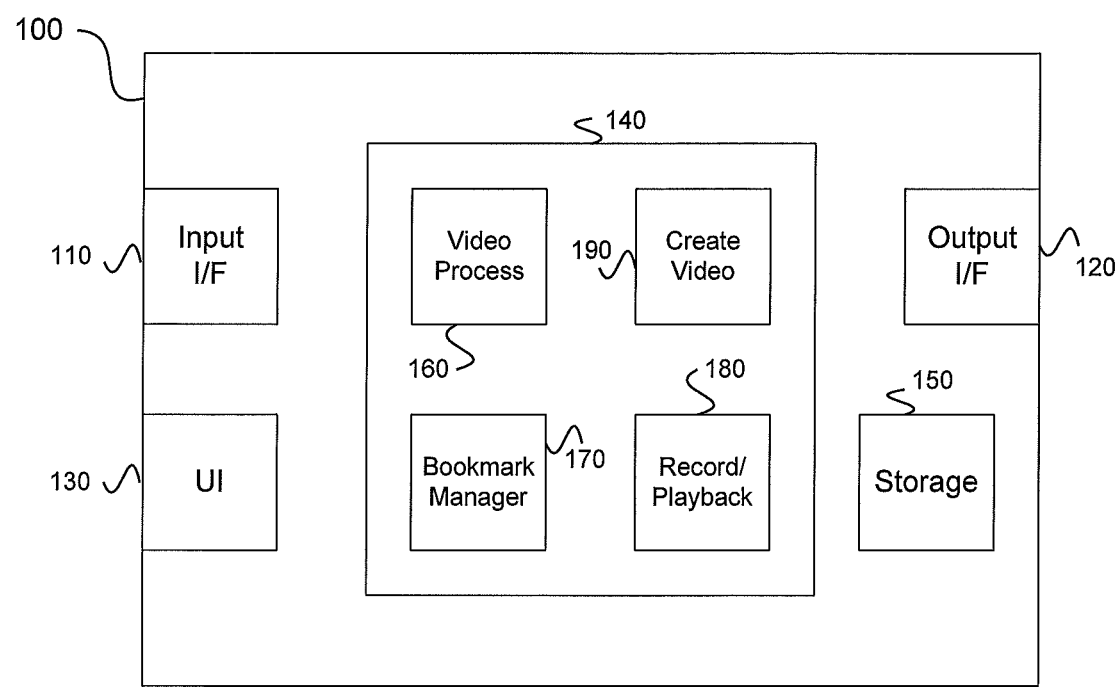
FIG. 1 illustrates a block diagram of an example Video Recording System (VRS), according to one embodiment.

The present invention is directed to a video recording system (VRS), such as Personal Video Recorders (PVRs) and Digital Video Recorders (DVRs), that enables a user to create and manage video bookmarks. A user can identify an event of interest in a video segment recorded in the VRS (bookmark the video segment). The video and the video bookmarks can be stored in a persistent storage device (e.g., hard drive, solid state storage, compact disk) or in a temporary storage device (e.g., video buffer). During playback of the recorded video, the video bookmarks can allow the user to move directly to the event of interest (bookmarked segment), rather than requiring the user to fast forward or rewind and search for that event. A user can identify (bookmark) an end of the event or the bookmarks can be assigned a duration that defines the end of the event. Bookmarks capturing the beginning and end of the event of interest provide additional options for playback of the recorded videos as well as options for creating new videos from the recorded videos.

Playback of the video can be limited to all or a set of the bookmarks in a recorded video. Playback of a bookmark can start at the beginning of the bookmark and continue for the duration associated with the bookmark or until an end of event bookmark. The playback order can be assigned (i.e., need not be chronological). Playback of all or a subset of bookmarks from a plurality of recorded videos can also be initiated and the order of playback can be assigned. The user can proceed to a next or previous bookmark during playback. A new video (highlight video) can be created by recording all or a subset of the bookmarks from a recorded video and the order of recording of the bookmarks can be assigned. A new video can be created by aggregating all or a subset of the bookmarks of several recorded videos together and the order of recording of the bookmarks can be assigned.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program can be uploaded to, and executed by, a machine comprising any suitable architecture. In addition, various other peripheral devices can be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

FIG. 1 illustrates a block diagram of an example VRS 100. The VRS 100 can include an input interface 110, an output interface 120, a user interface 130, a processor 140, and a storage medium 150. The input interface 110 can receive a video stream from an external content source. The external content source can provide video broadcasts or video on demand and can be provided by cable, satellite, and/or telephone companies. The input interface 110 can include a connector (e.g., coaxial connector, phone connector) to receive a medium (e.g., coaxial cable, phone cable) utilized to provide the video from the source, or can include more then one connector. The input interface 110 can also include an appropriate modem for extracting the video the medium.

The output interface 120 can provide a video stream to one or more devices that it will be displayed on. The output interface 120 can include a connector (e.g., S-Video connector, HDTV connector, composite video connector) to receive a medium (e.g., S-Video cable, HDTV cable) utilized to provide the video stream to the display device, or can include more then one connector. The output interface 120 can also include an appropriate modem for providing the video on the medium.

The user interface 130 can be included on the VRS (e.g., a control panel) and/or can be included in one ore more detached devices (e.g., remote controls) that interface with the VRS 100. The user interface 130 can consist of a configuration of buttons that are pressed to enter the appropriate commands. The user interface 130 can include audio controls that would allow you select commands by speaking The user interface 130 can be used to power on/off the VRS 110 and can be used to select operations of the VRS 100 to be performed including, but not limited to, video to be displayed (e.g., select broadcast channel, select video-on-demand content, program guide), video to be recorded, identification of items of interest (bookmarks) in the video being recorded, identification of a program from the recorded video that is limited to and/or arranged by bookmarks, selection of recorded video or a program to be played back, and selection of a program to be created as a new video.

The processor 140 can perform various functions that control the operations of the VRS 100. The processor 140 can include a video processing function 160, a bookmark manager 170, a record/playback function 180, and a video creation function 190. The video processing function 160 can process the received video as required. For example, if analog video is received the video processing function 160 can act as an A/D converter and covert analog video to digital video. If the video received is uncompressed and is to be stored (e.g., recording selected content, buffering current content being viewed) the video processing function 160 can act as an MPEG encoder and compress the uncompressed video. Alternatively, if compressed recorded content is selected for playback the video processing function 160 can act as an MPEG decoder and uncompress the compressed video.

The bookmark manager 170 can generate bookmarks based on events of interest that a user identifies and associate the bookmarks with locations in the video being recorded. The bookmark manager 170 can generate the bookmarks as a user is watching the video being recorded and selects an event of interest (e.g., by hitting a button on a remote control). The bookmark manager 170 can generate the bookmarks based on preprogrammed identification of events of interest set by the user (possibly when the video is selected to be recorded). The bookmark manager 170 can associate a duration or other parameters to the bookmarks generated. The parameters can be defined by the user in advance or at the time they initiate the bookmark. The parameters can be used to control the playback of the recorded video or to control the creation of new video from the recorded video.

The record/playback function 180 can be the interface with the storage medium 150. The record/playback function 180 can control the recording of video to and the playback of the video from the storage medium 150. The record/playback function 180 can record the bookmarks associated with the video and can use the bookmarks during playback to enable a user to jump around between items of interest identified (bookmarked) therein. The record/playback function 180 can be able to limit the playback of a recorded video to all or a set of the bookmarks and playback can be in a non-chronological order based on instructions (identification of program) provided thereto. The record/playback function 180 can be able to playback all or a subset of bookmarks from a plurality of recorded videos and playback can be in a non-chronological order and can arbitrarily jump between the plurality of recorded videos based on instructions (identification of program) provided thereto.

The video creation function 190 can create a new video (e.g., highlight video) from the bookmarks associated with previously recorded video. The video creation function 190 can create the new video from content associated with all or a set of the bookmarks in a recorded video and the content included can be in a non-chronological order based on instructions (identification of program) provided thereto. The video creation function 190 can record the associated bookmarks with the new video or can exclude the bookmarks therefrom. The video creation function 190 can create the new video from content associated with bookmarks in a plurality of recorded videos. The content included in the new video can be in a non-chronological order and can arbitrarily jump between the plurality of recorded videos based on instructions (identification of program) provided thereto.

The storage medium 150 can store selected video and bookmarks and can temporally buffer video that is being viewed so that the video can be paused or rewound without the need to initiate recording. The storage medium 150 can also store processor executable instructions, which, when executed by the processor cause the processor to perform certain functions. The storage medium 150 can be a magnetic storage medium, such as a hard disk drive (HDD), an optical storage medium, such as a digital video disk (DVD), an electronic storage medium, such as random access memory (RAM), a magneto/optical storage medium, or some combination thereof.

FIG. 2 illustrates an example flow chart for user initiation of bookmark(s) during viewing of video being recorded. Initially the user selects to record the video they are viewing 200. The user can decide to bookmark portions of the video for any number of reasons. The bookmark can indentify a location in the video where a certain event occurs (e.g., start of event bookmark). The bookmark can be used during playback to quickly locate the event identified. The user can utilize the user interface to initiate the bookmark (e.g., press a bookmark button) 210. The bookmark can automatically be assigned an identification (e.g., time stamp, chronological number).

According to one embodiment, the user can be provided an option to rename the bookmark at this point 220. The option to rename can include a window opening or a pop-up being displayed that queries the user whether they would like to rename the bookmark. The user can select the appropriate option using the user interface. If the user elects to rename the bookmark the user can enter an identification using the user interface. The ability to rename the bookmark at this point can be a configurable parameter that the user defines in advance. If the rename parameter is configured on, the user can automatically be provided the option to rename the bookmark when they initiate the bookmark. If the rename parameter is configured off, the rename option may not be provided unless the user indicates on the user interface (e.g., press the bookmark button a second time, press a rename button) their desire to rename the bookmark at this point. If the renaming option is initiated the presentation of the video can be automatically paused at this point. The viewing can continue once renaming is complete. The pausing of the video can ensure that the user does not miss anything.

According to one embodiment, the user can be provided the option to adjust the location (e.g., move back to an earlier point in video) of the bookmark at this point 230. This would enable a user to place the bookmark at the beginning of an event they wished to identify rather then sometime after that (amount of time it took user to initiate the bookmark). The option to adjust location can include a window opening or a pop-up being displayed that queries the user whether they would like to adjust the location of the bookmark. The user can select the appropriate option using the user interface. If the user elects to adjust the location of the bookmark the user can select with the user interface an amount of time in the past (e.g., estimate of time that has passed since the event occurred) to locate of the bookmark. Alternatively, the user can use the user interface to rewind the video to find the exact location they desire to place the bookmark. The ability to adjust the location of the bookmark at this point can be a configurable parameter that the user defines in advance. If the parameter is configured on, the user is automatically provided the option and if the parameter is configured off, the option is not provided unless the user indicates on the user interface (e.g., press the bookmark button a second time, press a relocate button) their desire to relocate the bookmark at this point. If the relocation option is initiated, the presentation of the video can be automatically paused and then resumed once complete (either from initial point of bookmark or relocated point).

According to one embodiment, when a user initiates a bookmark, the bookmark can automatically be relocated 230 to a location in the video a predefined amount of time (e.g., 5 seconds) prior to the location where the bookmark is initiated. The predefined amount of time can be a configurable parameter. The bookmark can be recorded in the storage medium with the assigned name and at the appropriate location of the video identified 240.

According to one embodiment, the user can initiate placement of a bookmark that identifies an end of the event that was previously bookmarked 250 (end of event bookmark). Marking the end of an event could be used during playback or to create new videos as will be discussed in more detail later. The end of event bookmark can be initiated using the user interface (e.g., depressing an end bookmark button). According to one embodiment, the user commands for initiating a bookmark can be the same whether it is meant to indicate a beginning of event or an end of event. The VRS can make a determination of the bookmark status (beginning event, end event). For example, the VRS can determine the first bookmark initiated in a video being recorded indicates a start of event and can determine a second bookmark initiated in the video is a corresponding end of event if it occurs within a defined amount of time after the first bookmark (e.g., 5 minutes). The amount of time can be configurable. The user can be provided with the ability to confirm the bookmark status determination and if necessary to correct the determination.

The end of event bookmark can be automatically assigned an identification. The end of event bookmark identification can be associated with the identification assigned to the bookmark identifying the beginning of the event so that the two can easily be associated with each other. The bookmark can be recorded in the storage medium with the assigned name and at the appropriate location of the video identified 260. The bookmark can include parameters that associate it with the beginning of event bookmark previously identified and recorded.

According to one embodiment, when a user initiates a bookmark, the bookmark can automatically have an ending point for the event determined as a predefined amount of time (e.g., 5 minutes) from the location where the bookmark is initiated (a duration). The predefined amount of time can be a configurable parameter. The predefined duration can be recorded with the bookmark in the storage medium 240 and can be used during playback of recorded videos or creation of new videos from the recorded videos. Alternatively, the predetermined duration can be used to automatically initiate an end of event bookmark at an appropriate location 250 and the bookmark can be recorded in the storage medium 260.

By way of example, if a user is watching and recording the *Super Bowl* they may desire to bookmark the exciting plays (e.g., touchdowns) as they occur. In this case it will be assumed that the user will not want to have the action interrupted (paused) as they are watching the live presentation. Accordingly, the renaming (220) and the user initiated relocation (230) can be configured off. Furthermore, the user may have the automatic relocation (230) configured on for a certain amount of time (e.g., for 30 seconds) so that when they initiate the bookmark the bookmark is placed at a location that amount of time prior to. Moreover, the user may have the automatic "end event" bookmark (250) configured on for a certain duration (e.g., for two minutes) so that an end of event bookmark is automatically configured for that amount of time after the event.

FIG. 3 illustrates an example flow chart for preprogramming of bookmark(s) to be inserted in video to be recorded. The user can select a video to be recorded 300. The video selected to be recorded can be a one time event (e.g., movie, sport event) or can be a recurring event (e.g., daily program, weekly program). When the video selected to be recorded is a recurring event the recording selection can be for a single occurrence, various occurrences, or all occurrences of the event. The user can then select to define bookmarks to be placed in some or all of the occurrences of the video being recorded 310. The user can be asked if they would like to define bookmarks when they select the video to be recorded or they can initiate the defining of the bookmarks utilizing the user interface (e.g., depressing the bookmark button).

The user can define a location for placement of the bookmark 320. The location can be an estimated amount of time from the beginning of the video where the event of interest will begin. The user can define a duration for the bookmark 330. The duration can be an estimate of amount of time that the event will last. The duration can be used during playback of the recorded video or creation of new videos therefrom. Alternatively, the duration can be used to determine an end of event bookmark and the end of event bookmark can be utilized during playback or creation. The user can name the bookmark. Steps 320, 330 can be repeated any number of times. The record video instructions 300 and the bookmark instructions 320, 330 can be stored 340 while awaiting execution. At the appropriate time the instructions are executed 350 and the video and the bookmarks are recorded 360.

By way of example, the user may select to record the *Tonight Show with Jay Leno* and bookmark the monologue. As the monologue is at the beginning of the show the bookmark location may be defined as a very low amount of time (e.g., 30 seconds). As Jay Leno's monologue is typically long, the duration may be defined for a relatively long time (e.g., 20 minutes).

FIG. 4 illustrates an example flow chart for playback of a recorded video(s) with bookmark(s). Initially a user selects a recorded video to playback 400. The list of bookmarks recorded in the video can be displayed 410. The user can initiate the display of the bookmarks or the display can be provided when the playback of the video is selected. The bookmarks can be labeled with the identifications assigned when initiated (e.g., chronological number) or the name provided if previously done. The user can be provided with the opportunity to rename the bookmarks 420. The user can select one or more bookmarks of interest from the list 430. Playback of the video can begin from a selected bookmark. If no bookmark is selected playback can begin from the first bookmark located in the video.

If the bookmarks have defined durations or ends, the video can jump from one bookmark to the next bookmark during playback upon a determination that an end of a bookmark was reached. The user can select an order for the playback of the defined bookmarks 440. The result of the selection of the bookmarks 430 and the ordering of the bookmarks 440 can be the identification of a program for playback. Steps 400-440 can be repeated several times prior to initiation of playback if it is desirable to include the playback from the bookmarks in several videos at one time as part of the program. Steps 400-430 can be repeated several times prior to the selection of the order so the program can include an order mixed across several videos. Once the selection process is complete the playback of the program can be initiated 450. During playback the user can skip to previous or next bookmarks 460.

By way of example, the user can create a playback program for the *Super Bowl* that includes one of more of the highlights bookmarked and a defined order for the highlights. If during viewing of the playback program created the user wishes to rewatch a particular bookmarked event (e.g., a great touchdown catch) at the conclusion of the bookmark, they can skip to the previous bookmark and watch it again. By way of another example, the user can create a playback program from multiple episodes of the *Tonight Show with Jay Leno* where the bookmarks limit the playback to the monologues. If the user does not want to watch (or finish watching) a particular bookmarked event (e.g., the user finds that Tuesday's monologue is not funny, or the monologue ends prior to the end of the bookmark) they can skip forward to the next bookmarked event (e.g., next night's monologue).

FIG. 5 illustrates an example flow chart for creation of a new video (e.g., highlight video) from a recorded video(s) with bookmark(s). Initially a user selects a recorded video that they wish to capture at least portions of in a new video 500. The list of bookmarks recorded in the video can be displayed 510 and the user can be provided with the opportunity to rename the listed bookmarks 520. The list displayed can be limited to the bookmarks that have defined durations or ends. The user can select one or more bookmarks of interest from the list 530 and can select an order for the selected bookmarks 540. The result of the selection of the bookmarks 530 and the ordering of the bookmarks 540 can be the identification of a program that will be used for creating the new (e.g., highlight) video. Steps 500-540 can be repeated several times if it is desirable to include bookmarks associated with several videos in the highlight program. Steps 500-530 can be repeated several times prior to the selection of the order so the order can be mixed across several videos in the highlight program. Once the selection process is complete the creation of the new video from the highlight program can be initiated 550. Once the highlight video is created it can be recorded in the storage medium 560. The highlight video can be recorded with or without the bookmarks. Recording with the bookmarks would enable a user to skip forward or backward from one bookmark to the next during playback thereof.

Although the disclosure has been illustrated by reference to specific embodiments, it will be apparent that the disclosure is not limited thereto as various changes and modifications can be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:
1. A video recording system comprising:
a hardware processor that:
  receives, via a video input interface, a first video from a first video source;
  causes the first video to be presented, via a video output interface;
  receives, via a user interface, input identifying a first beginning bookmark and a first end bookmark at locations in the first video during presentation of the first video;

places the first beginning bookmark and the first end bookmark at the associated locations of the first video;
receives, via the video input interface, a second video from the video source, wherein the first video and second video each correspond to an event that is part of a recurring event;
places a second beginning bookmark and a second end bookmark at locations in the second video based on the locations of the first beginning bookmark and the first end bookmark in the first video;
creates a third video based on the first beginning bookmark, the first end bookmark, the second beginning bookmark and the second end bookmark;
controls recording of the third video to a storage medium;
controls playback of the third video, from the storage medium; and
a video output interface that provides the third video to a display device.

2. The system of claim 1, wherein the hardware processor further:
determines an order of the first beginning bookmark, the first end bookmark, the second beginning bookmark and the second end bookmark in the third video based on input received via the user interface; and
controls playback of portions of the third video associated with the bookmarks in the determined order.

3. The system of claim 1, wherein hardware processor further:
generates a fourth beginning bookmark and a fourth end bookmark;
places the fourth beginning bookmark and the fourth end bookmark at locations in a fourth video based on the first beginning bookmark and the first end bookmark; and
creates the third video further based on the fourth beginning bookmark, and the fourth end bookmark such that the third video includes portions of the first video, the second video and the fourth video, wherein the fourth video corresponds to an event that is part of the recurring event.

4. A video recording system comprising:
a video input interface that receives a first video and a second video provided by a video source, wherein the first video and the second video each correspond to an event that is part of a recurring event;
a storage medium: and
a hardware processor that:
receives, via a user interface, input identifying a first set of bookmarks associated at locations in the first video;
generates bookmarks corresponding to locations in the first video and the second video
assigns end points for the bookmarks;
generates a third video based on selection of the first video and the second video and selection of at least a subset of the bookmarks associated with the first video and the second video;
controls recording of the first video and second video and the associated bookmarks to the storage medium;
controls playback of the at least a subset of the associated bookmarks for the one or more of the recorded videos in order to present the third video, wherein playback of each of the at least a subset of the associated bookmarks is to end at the assigned endpoint; and
controls recording of the third video, wherein the third video includes a second set of bookmarks and portions of the first and second video; and
a video output interface that transmits a video selected for display to a display device.

5. The system of claim 4, wherein the hardware processor generates the third video further based on a selection of an order of the recorded first and second videos and an order of the at least a subset of bookmarks for each of the selected recorded first and second videos.

6. The system of claim 4, wherein the hardware processor assigns the end points for at least a subset of the bookmarks based on end-bookmark information.

7. The system of claim 4, wherein the hardware processor assigns the end points for at least a subset of the bookmarks based on durations associated with the first set of bookmarks generated.

8. The system of claim 4, wherein the hardware processor controls jumping to a next or a previous bookmark in the third video based on commands received.

9. The system of claim 4, wherein the hardware processor controls recording of the second set of bookmarks in the third video.

10. The system of claim 4, wherein the hardware processor receives bookmark commands as part of record video commands received via the user interface.

11. A processor implemented method utilized in a video recording system to generate and manage bookmarks, the method utilizing the processor to:
receive input identifying a first set of bookmarks in a first video;
generate bookmarks corresponding to locations in a first video and a second video being recorded, wherein the first video and the second video each correspond to an event that is part of a recurring event;
assign end points for the bookmarks based on the first set of bookmarks;
display a list of recorded videos including the first video and the second video, and the bookmarks associated therewith for selection;
generate a third video based on selection of the recorded first video and second video and selection of at least a subset of the bookmarks associated with the recorded first video and second video;
play the third video from the recorded first video and second video by playing the at least a subset of the associated bookmarks selected for the recorded first video and second video selected, wherein playback of each of the at least a subset of the associated bookmarks is to end at the assigned endpoint; and
control recording of the third video, wherein the third video includes a second set of bookmarks and portions of the first video and second video associated with the generated bookmarks.

12. The method of claim 11, further comprising jumping to a next or previous bookmark in the program based on commands received.

* * * * *